United States Patent
Kirchhoff et al.

(10) Patent No.: US 7,129,315 B2
(45) Date of Patent: Oct. 31, 2006

(54) PROCESS FOR THE PRODUCTION OF POLYCARBONATE

(75) Inventors: Jörg Kirchhoff, Köln (DE); Thomas König, Leverkusen (DE); Klemens Kohlgrüber, Kürten (DE); Steffen Kühling, Meerbusch (DE); Dirk Van Meirvenne, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/105,680

(22) Filed: Apr. 14, 2005

(65) Prior Publication Data

US 2005/0239996 A1    Oct. 27, 2005

(30) Foreign Application Priority Data

Apr. 21, 2004   (DE) ...................... 10 2004 019 294

(51) Int. Cl.
   *C08G 64/00*   (2006.01)
(52) U.S. Cl. ...................... 528/196; 422/131; 524/115; 528/198
(58) Field of Classification Search ................ 524/115; 528/196, 198; 422/131
   See application file for complete search history.

(56) References Cited

U.S. PATENT DOCUMENTS

| 4,699,976 A | 10/1987 | Matsubara et al. | 528/501 |
| 5,684,087 A | 11/1997 | Wulff et al. | 525/63 |
| 5,861,474 A | 1/1999 | Weller et al. | 528/501 |
| 6,627,040 B1 | 9/2003 | Elsner et al. | 159/47.1 |
| 6,710,159 B1 | 3/2004 | Morhenn et al. | 528/310 |
| 2004/0255780 A1 | 12/2004 | Konig et al. | 95/266 |

*Primary Examiner*—Terressa Boykin
(74) *Attorney, Agent, or Firm*—Joseph C. Gil; Aron Preis

(57) ABSTRACT

A process for the isolation of polycarbonate produced by the interfacial polymerization process is disclosed. Accordingly, the process entails (a) evaporating the organic solvent from the solution that contains solvent and polycarbonate to obtain a material system that contains 90 to 99.95% polycarbonate, the percent being relative to the weight of the system, and (b) passing the material system through inlet openings of a separating vessel to obtain a plurality of streams of polycarbonate, on entry into the inlet openings said material system being supersaturated with volatile constituents to an extent of at least 1 bar and having a temperature of 250° to 340° C. and a flow rate of 0.1 to 20 kg/hour, and (c) degassing the streams in the separating vessel wherein the pressure is 0.1 to 20 mbar to effect degassing of the polycarbonate.

7 Claims, 2 Drawing Sheets

PROCESS FOR THE PRODUCTION OF POLYCARBONATE

FIELD OF THE INVENTION

The invention relates to polycarbonates and in particular to a process for the isolation of polycarbonate produced by the interfacial polymerization process.

BACKGROUND OF THE INVENTION

The process for synthesizing polycarbonate by the interfacial polymerization process is described variously in the literature, for example inter alia in Schnell, "Chemistry and Physics of Polycarbonates", Polymer Reviews, Volume 9, Interscience Publishers, New York, London, Sydney 1964, pp. 33–70.

In the interfacial polymerization process the phosgenation of a disodium salt of a bisphenol (or a mixture of various bisphenols) in aqueous-alcoholic solution (or suspension) is carried out in the presence of an inert organic solvent or solvent mixture that forms a second phase. The oligocarbonates that are formed, and that are present mainly in the organic phase, undergo condensation by means of suitable catalysts to form high molecular weight polycarbonates dissolved in the organic phase. The organic phase is finally separated.

The polycarbonate must then be isolated from the organic phase. The current methods for concentrating the polycarbonate solution and for isolating the polycarbonate are described in the patent literature and in text books and are known to the person skilled in the art. The isolation of the polycarbonate from the solution is preferably carried out by evaporating the solvent by heating or applying a vacuum. This process requires the use of a high boiling point (>100° C.) solvent, for example chlorobenzene, in order directly to obtain the melt phase after the evaporation of the solvent. In order to improve the solubility of the polymer in the solvent during the reaction, a mixture of one or more high boiling point solvents and the low boiling point compound dichloromethane is also used.

Typically the weight ratio of dichloromethane to the high boiling point solvent is about 1:1.

Another possibility is to inject a heated gas, in particular steam, in order to expel the volatile constituents. In this case the polycarbonate solution is sprayed together with the carrier gas and polycarbonate is formed as a solid, especially as a water-wet suspension. Other isolation methods include crystallization and precipitation as well as heating the residues of the solvent in the solid phase. The last method requires the use of dichloromethane as solvent, whereby residual contents of volatile constituents of about 2 ppm dichloromethane may be achieved. Residual contents of dichloromethane particularly interfere in the polycarbonate since dichloromethane with residual moisture together split off hydrogen chloride during plastics processing and may thus cause discolorations of the polycarbonate and lead to corrosion of the equipment.

In the known methods for evaporation, or also flash evaporation, polycarbonate solutions are repeatedly heated under slight excess pressure to temperatures above the boiling point and these superheated solutions are then flashed into a vessel at a lower pressure than the vapor pressure in the solution. The evaporation or flash evaporation of the solvent may be carried out using various methods, equipment and machinery, e.g. stripping extruders, thin-film evaporators or friction-compaction devices. Conventional methods for the apparatus-based evaporation of polycarbonate solutions are known to the person skilled in the art. For example the superheated solution may be flashed into a heated coil evaporator that terminates in a separator. In this connection it may be advantageous to carry out the process in several stages. In addition processes are known in which in some cases a multistage concentration of the solution is carried out in vertical shell-and-tube heat exchangers.

In order to achieve particularly low contents of residuals falling strand evaporators may be used for the last degassing stage. In this case the polymer melt is formed into thin strands in a separator under a vacuum and elevated temperature and thereby freed from the solvent. The disadvantage of the falling strand technique is that an effective degassing is ensured only by stable strands, i.e. strands that do not break off in the equipment. The stability of the strands is influenced by the viscosity of the polymer solution. Too low a viscosity may lead to strand breakages, which in turn means a restriction of the operating parameters in terms of temperature and entry content of residual volatile constituents. Apart from the negative influence on the viscosity, too high an entry concentration of volatile constituents has direct deleterious effects on the degree of degassing that may be achieved, since the mass transfer is determined purely by diffusion. The surface available for the mass transfer is however fixed by the strand geometry. The necessary large area of the melt distributor that is needed to produce the strands requires in turn large expensive equipment.

It is also known from the prior art to carry out the last degassing step in the working-up of polymers under foaming (expansion) with or without entrainment agents. Methods for the apparatus-based degassing of thermoplastic polymers that are based on the principle of foam degassing exist in the prior art. However, these methods often have the disadvantage that either very large amounts of gas have to be removed, or that sufficiently low content of residuals cannot be achieved. Furthermore, the methods described in the literature are often inflexible as regards throughput and polymer type and viscosity, and as regards the entry concentration of volatile components at the inlet to the respective degassing stage.

EP-A 200 368 describes the foam degassing of styrene polymers in a two-stage process. The method is based on the fact that the amount of solvent in the polymer solution is adjusted to be sufficiently large so as to initiate a foaming.

EP-A 914 355 describes mixing a sparingly soluble separating agent in a polymer solution followed by flashing, with foaming, into a separator under low pressure. The process described there is used to separate readily volatile solvents with the aid of foaming agents. The readily volatile separating agent is not completely dissolved, but is dispersed.

DE-A 100 15 862 describes a multistage process for removing volatile constituents from polyamides. Before the last degassing stage foaming agents for this, e.g. nitrogen, carbon dioxide or water, are dispersed using a static mixer and thereby partially dissolved. The polyamide melt is then flashed in a vertical shell-and-tube heat exchanger or in a loop evaporator or in a combination thereof into a degassing vessel under low pressure. Wire loops onto which the melt flows from above ensure an extended residence time and thus a better degassing result.

SUMMARY OF THE INVENTION

Figure 1:
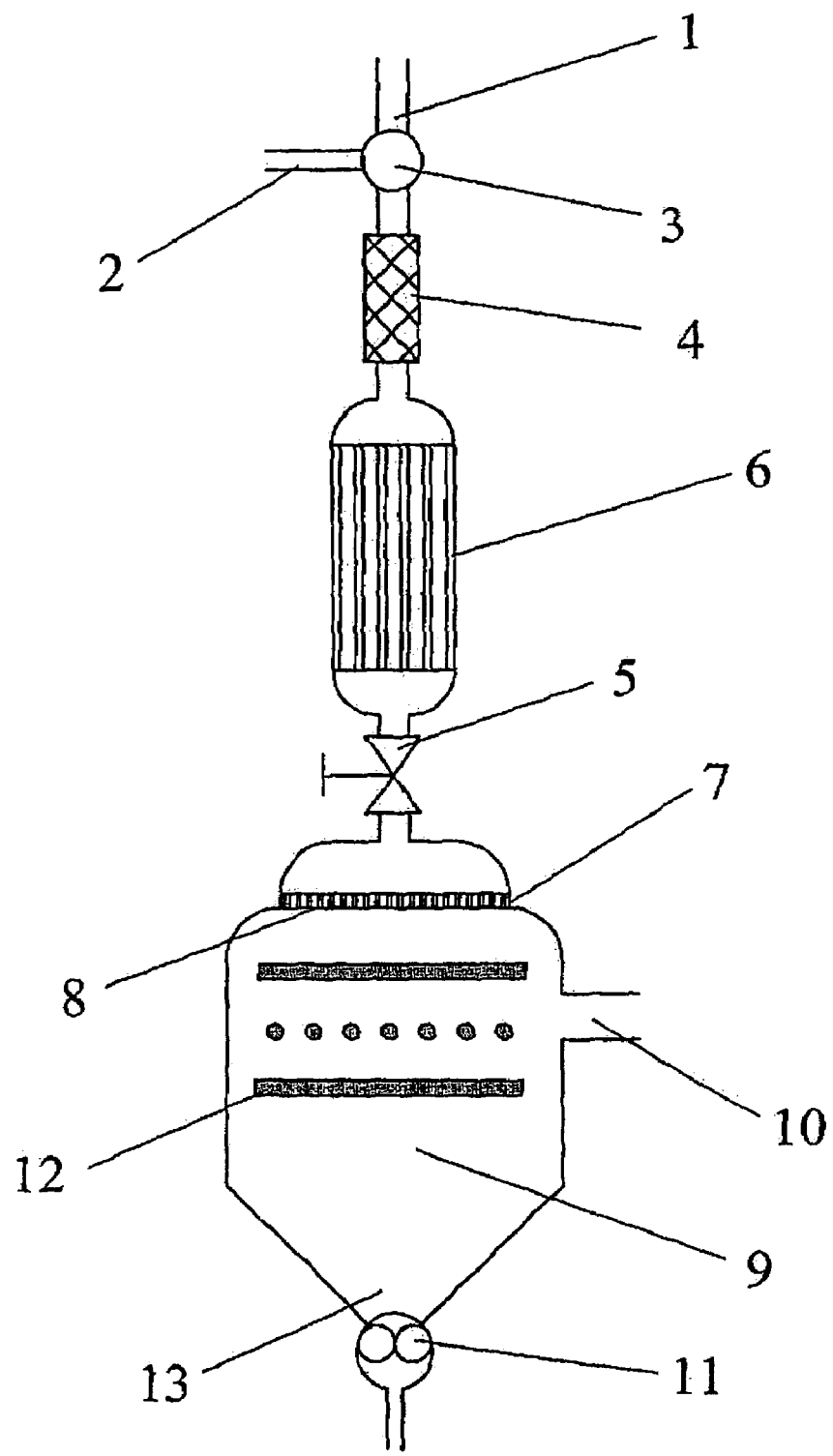
FIG. 1 shows diagrammatically a first embodiment of the separating vessel for carrying out the process according to the invention.

A process for the isolation of polycarbonate produced by the interfacial polymerization process is disclosed. Accordingly, the process entails (a) evaporating the organic solvent from the solution that comprises solvent and polycarbonate to obtain a melt that contains 90 to 99.95% polycarbonate, the percentage being relative to the weight of the melt, and (b) passing the melt through inlet openings of a separating vessel to obtain a plurality of streams of polycarbonate, on entry into the inlet openings said melt being supersaturated with volatile constituents to an extent of at least 1 bar and having a temperature of 250° to 340° C. and a flow rate of 0.1 to 20 kg/hour, and (c) degassing the streams in the separating vessel wherein the pressure is 0.1 to 20 mbar to effect degassing of the polycarbonate.

DETAILED DESCRIPTION OF THE INVENTION

The object of the present invention is to provide a process for the isolation of polycarbonate produced by the interfacial polymerization process, in which the polycarbonate is obtained dissolved in an organic solvent. By means of the process low residual contents of volatile components totalling less than 250 ppm, preferably less than 100 ppm and particularly preferably less than 25 ppm, referred to the total weight of the polycarbonate, are achieved. Volatile components are understood to include solvents such as monochlorobenzene and dichloromethane, the corresponding unreacted monomers, e.g. BPA, and their volatile oligomers such as dimers, trimers and tetramers. In particular the process should be capable of removing dichloromethane employed in the reaction to levels of below 2 ppm and to yield preferably dichloromethane-free product containing less than 0.5 ppm of dichloromethane.

The process is highly flexible in terms of throughput and polycarbonate type and viscosity and as regards the entry concentration of volatile components at the inlet to the respective degassing stage. Flexibility means in this connection that the aforementioned parameters and product properties may be altered in a plant while maintaining the quality, without complicated changeover of equipment or downtimes. In other words, a constant quality is achieved independently of the entry conditions.

The present invention provides a process for the isolation of polycarbonate produced by the interfacial polymerization process from a solution in an organic solvent, said process comprising the following steps:

(a) evaporation of the organic solvent to obtain a content of polycarbonate of 90 to 99.95 wt. %, (b) optionally mixing the melt obtained in step (a) with a foaming agent, (c) degassing the melt obtained from (a) and optionally (b) by feeding the melt through inlet openings into a separating vessel, characterised in that in the degassing according to step (c) the melt is subdivided by the inlet openings into partial streams of 0.1 to 20 kg/hr and on entry into the inlet openings has a supersaturation with volatile constituents of at least 1 bar as well as a temperature of 250° to 340° C., wherein the pressure in the separating vessel is 0.1 to 20 mbar.

According to step (a) of the process according to the invention the solution of polycarbonate in an organic solvent (hereinafter simply referred to as polycarbonate solution) is first of all evaporated to such an extent that the content of polycarbonate is 90 to 99.95 wt. %. The polycarbonate solution thereby obtained is also synonymously referred to as polycarbonate melt. Step (a) may be carried out as a one-stage or multistage process, preferably a multistage process.

Conventional methods for evaporating polymer solutions according to step (a) are known to the person skilled in the art. For example, the superheated solution may be flashed into a heated coil evaporator that terminates in a separator. An example of such a process is described for example in DE 1 921 045 A (=U.S. Pat. No. 3,834,441 incorporated herein by reference). In this connection it may be advantageous not to allow the concentration differences between stages, or in other words the temperatures of the superheating, to become too large, but instead choose a two-stage to four-stage process, as described for example in EP 1 094 873 A. In addition processes are known in which a pre-concentration of the polycarbonate solution is carried out in vertical shell-and-tube heat exchangers. Such processes, in some cases multistage processes, are described for example in DE 19 835 744 (=U.S. Pat. No. 6,534,619 incorporated herein by reference). Polymer concentrations of 90 to 99.95 wt. % or above may be achieved by such processes. Combinations of coil evaporators and shell-and-tube heat exchangers are also conceivable.

Starting from the polycarbonate melt obtained according to step (a), a polycarbonate with a low content of volatile constituents is optionally obtained according to step (b) by adding a foaming agent and according to step (c) in at least one foam degassing step by splitting up the polycarbonate melt into partial streams and also by reducing the pressure. A low content of volatile constituents is understood within the context of the present invention to mean a concentration of the volatile constituents of less than 250 ppm, preferably less than 100 ppm and particularly preferably less than 25 ppm, in each case referred to the total weight of the polycarbonate.

The volatile constituents to be removed according to step (c) include the solvents of the polymerization reaction according to the interfacial polymerization process, in particular monochlorobenzene and residual amounts of dichloromethane. The weight fraction of monochlorobenzene before the foam degassing (step (c)), i.e. on entry into the inlet nozzles of the separating vessel, is generally less than 10%. The entry content of dichloromethane, referred to the weight, is generally less than 5%. Further possible solvents for the polycarbonate production are known to the person skilled in the art, for example ethylbenzene, toluene or xylene, which if present also have to be removed to low residual contents. In addition the polycarbonate melt contains residues of monomers or volatile oligomers whose proportion is likewise reduced by the process according to the invention.

In order to initiate a foaming of the polycarbonate melt in step (c) and thereby achieve a particularly effective degassing, sufficient solvent must be present in the polycarbonate melt. The supersaturation of the polycarbonate melt with volatile constituents on entry into the inlet openings is correspondingly at least 0.1 bar, preferably at least 0.5 bar and particularly preferably at least 1 bar. The supersaturation is defined as the difference between the vapor pressure of all volatile components on entry into the inlet openings and the pressure in the separating vessel (hereinafter also referred to as separator or degassing vessel). The vapor pressure is the sum of the partial pressures of all components present in the polymer melt and depends on the temperature and the concentration of the volatile constituents.

The success of the degassing is largely independent of whether the supersaturation is generated only by the solvents present in the melt or whether in addition a foaming agent is added. The temperature and the concentration of the volatile components determine the vapor pressure. If the required vapor pressure is generated simply by residues of solvents in the polycarbonate melt, then the use of foaming agents may be dispensed with.

If a sufficient amount of solvent is not present in the polycarbonate melt, i.e. if the vapor pressure of the solvent alone is too low, a foaming agent is added in order to create the necessary vapor pressure in the polycarbonate melt. Accordingly, in one embodiment of the process according to the invention the melt obtained from step (a) is mixed with a foaming agent according to step (b) before the degassing according to step (c).

The foaming agent is as a rule a readily volatile substance with a high vapor pressure. The foaming of the polycarbonate melt is initiated by the high vapor pressure of the foaming agent. The foam produces a large increase in surface area, which is advantageous for the degassing. In addition the partial pressure of the residues of solvents or other volatile constituents in the gaseous phase of the separator that are present in the polymer is reduced, whereby in principle lower residual contents of volatile constituents is achieved.

As foaming agent there is preferably used an inert gas or an inert liquid or a mixture of inert gases and/or liquids. Examples of suitable foaming agents are nitrogen, carbon dioxide, water, methane and helium. Particularly preferably water, carbon dioxide or nitrogen is used as foaming agent, and most particularly preferably nitrogen is used.

Within the scope of the present invention it was also found that the success of the degassing is significantly improved if the foam degassing, with or without the addition of a foaming agent, is carried out repeatedly in succession. In this connection the necessary supersaturation must be ensured in each degassing stage. If necessary a foaming agent according to step (b) may be added before each foam degassing step (c). If the degassing is carried out in several stages care should be taken to ensure that the overall residence time remains short in order to prevent undesirable discoloration or degradation. A short residence time may be achieved by a suitable design of the apparatus. If the foam degassing is carried out in several stages, the individual stages need not necessarily be carried out in exactly the same way. Depending on the particular application, i.e. depending on throughput, viscosity of the product and temperature, the stages may be carried out differently as regards their execution or splitting of the partial streams, amount of foaming agent, temperature, and diameter of the inlet openings.

The foaming agent is distributed in step (b) in the polycarbonate melt. A static mixer is preferably used for the distribution and dissolution of the foaming agent. Conventional modifications of static mixers for mixing highly viscous polycarbonate melts have been known for a long time from the prior art. Static mixers preferably have the structure of an SMX mixer, which is described in detail for example in Arno Signer, Statisches Mischen in der Kunststoffverarbeitung und -herstellung, Plastverarbeiter 11(43), 1992. Static mixers according to EP 947 239 A or U.S. Pat. No. 6,394,644 B incorporated herein by reference may also preferably be used. Particularly preferred is an SMX mixer whose free internal diameter varies along the length of the mixer as a result of various mixing elements, in which particularly preferably the free internal diameter decreases for example in a cascade manner or in stages in the direction in which the material flows through the mixer.

In order to improve the dispersion and dissolution of the foaming agent in the polycarbonate melt, the pressure in the static mixer may be increased by means of a suitable device, for example a pressure retention valve or a throttle. It is known to the person skilled in the art that a larger amount of a volatile substance may be dissolved in a melt by increasing the pressure.

The state of the polycarbonate melt on entry into inlet openings according to step (c) before the flashing, namely the existence of one or more phases, is decisive for the success of the degassing and for the process stability. A particularly good degassing result is achieved if all volatile components, including foaming agents, are completely dissolved before the flashing. Completely dissolved within the context of the present invention means that the polycarbonate melt with the solvent contained therein and added foaming agent forms a single-phase mixture. No bubbles or droplets are then present in the polycarbonate melt on entry into the inlet openings.

In particular the optionally mixed-in foaming agent should be completely dissolved. The amount of foaming agent, the pressure and the temperature are in this connection chosen so that the foaming agent is completely dissolved in the polycarbonate melt. The pressure and temperature that are necessary for the complete dissolution of a specific amount of foaming agent depend on the nature of the foaming agent. It is known to the person skilled in the art that, for a given temperature of a polycarbonate melt, the amount of a foaming agent that may be dissolved is increased by raising the pressure. The same is also true for the other volatile components contained in the polycarbonate melt.

The foaming agent should be chosen so that even small amounts are sufficient in order, after a pressure release, to produce a vigorous foaming of the polycarbonate melt on entry into the inlet openings. Within the scope of the process according to the invention a small amount means the addition to the polycarbonate melt of 0.01 to 1 wt. % of foaming agent, preferably 0.02 to 0.5 wt. % and particularly preferably 0.05 to 0.3 wt. %, referred to the weight of the polymer. Despite this small amount of foaming agent the flashing successfully takes place accompanied by foaming of the polycarbonate melt.

The vapor pressure of the foaming agent for the temperature prevailing at the entry to the inlet openings of the degassing stage (c) at the adjusted concentration of foaming agent in the melt is 0.1 to 100 bar, preferably 0.5 to 60 bar and particularly preferably 1 to 40 bar.

The polycarbonate melt may be heated or cooled, preferably heated, before, during or after the mixing in of the foaming agent. An increased temperature means a higher vapor pressure of the volatile components, with the result that the foam formation is assisted in the subsequent degassing and the separation of the volatile constituents successfully takes place more easily. Suitable apparatus and equipment for heating or cooling a polymer melt, for example shell-and-tube heat exchangers, plate heat exchangers or heat exchangers with static mixers, are known to the person skilled in the art.

Preferably the temperature change in the melt from the point of addition of the foaming agent up to the entry into the inlet openings according to step (c) is not more than 100° C., preferably not more than 90° C. The temperature of the polycarbonate melt at the entry to the inlet openings is preferably 250° C. to 340° C., particularly preferably 260° C. to 320° C. A further heating of the polycarbonate melt is also possible after the entry to the inlet openings up to the entry to the degassing vessel, if for example heated tubes are used as inlet openings and flashing devices. Preferably the temperature difference between the entry to the inlet openings and the entry to the separating vessel is not more than 100° C., particularly preferably not more than 80° C.

According to step (c) the polycarbonate melt is introduced via inlet openings into a separating vessel in the form of a plurality of streams of 0.1 to 20 kg/hr, preferably 0.125 to 10 kg/hr and particularly preferably 0.15 to 5 kg/hr.

The polycarbonate melt is flashed in the separating vessel at a low pressure of 0.1 to 20 mbar, preferably 0.3 to 10 mbar, particularly preferably 0.5 to 5 mbar. The temperature of the polycarbonate melt on entry into the degassing vessel is according to the invention 250° to 360° C., preferably 260° to 340° C. and particularly preferably 270° to 320° C.

The polycarbonate melt is introduced from above through the inlet openings into the separating vessel. The inlet openings are accordingly located in the upper region of the separating vessel. The inlet openings are in particular arranged in one level, though they may also be arranged at different levels in the upper region of the separating vessel.

The inlet openings perform the function of flashing devices. An essential design criterion for these flashing devices is the pressure loss that is generated by them. The pressure loss is calculated from the viscosity of the polymer melt, which in turn depends on the type of product, temperature and concentration of volatile constituents and foaming agent, and the throughput and geometry of the flashing devices. The connection between the diameter of the bores, rate of flow, and viscosity of the polycarbonate melt and pressure loss is known to the person skilled in the art. When calculating the pressure loss the person skilled in the art may disregard the influence of the foaming agent, so that a design according to known rules of the technology is possible. The pressure loss should be adjusted so that the absolute pressure before the entry to the inlet openings is sufficiently high in order to prevent a foaming before the entry to the inlet openings. The foaming takes place only after the entry into the inlet openings.

Suitable inlet openings are for example bores or slits, hereinafter termed nozzles, in a plate (also termed nozzle plate). Nozzles are preferably designed as bores in a nozzle plate. The plate may in principle be of any suitable thickness.

In a preferred implementation of the process according to the invention the plurality of streams of the polycarbonate melt are in each case guided through nozzles in a horizontally arranged plate. The bores terminate directly in the separating vessel, in which a low pressure exists. Preferred diameters of the nozzles are 0.8 to 5 mm, particularly preferably 1 to 4 mm.

Tubes also may be used as inlet openings. Preferably the tubes are arranged vertically and polycarbonate melt flows through the tubes from the top downwardly. Preferred tube diameters are 4 to 20 mm, particularly preferably 5 to 15 mm.

In a further preferred embodiment of the invention the tubes are used as a heat interchanger or heat exchanger. For this purpose they are arranged in particular in the form of a parallel bundle and are surrounded by a heat transfer medium, preferably a liquid heat transfer oil or condensing steam or heat transfer oil vapor. The length of the tubes is preferably 300 to 2500 mm, particularly preferably 500 to 2000 mm.

The tubes of the shell-and-tube heat exchanger thus terminate directly in the separating vessel. The individual tubes are designed so that the polycarbonate melt does not yet foam on entry into the shell-and-tube heat exchanger. The tubes may be made narrower by nozzles in order to maintain a predetermined pressure loss. The pressure loss in an individual tube is in this connection dependent on the state of the polycarbonate, the temperature at the inlet and outlet of the tube, the throughput, and the proportion of volatile constituents at both the inlet and outlet of the tube. The polymer foam is formed only at the outlet side of the tubes to the separator, i.e. at the inlet openings of the separating vessel. The diameters of the tubes are in this connection preferably 4 to 20 mm, particularly preferably 5 to 15 mm. Nozzles that are used to increase the pressure loss have diameters of 0.8 to 5 mm, preferably 1 to 4 mm. The rate of flow of the resin per tube is 0.1 to 20 kg/hr.

The execution of the process according to the invention with a shell-and-tube heat exchanger provides a preferred method for heating or cooling the polymer melt, as discussed further hereinbefore.

The spacings of the inlet openings, measured from midpoint to midpoint, and thus the spacings of the plurality of streams on entry into the separating vessel, are 5 to 50 mm, preferably 10 to 40 mm and particularly preferably 15 to 25 mm.

The residence time of the polycarbonate melt in the separating vessel must on the one hand be sufficiently long to permit a sufficient degassing. The residence time must on the other hand not be too long, so that it does not affect the quality of the polycarbonate. The residence time of the polycarbonate melt in the separating vessel in step (c) is preferably at most 10 minutes, particularly preferably at most 5 minutes.

In a further modification of the process according to the invention the residence time may be influenced by guide elements. The guide elements have the function of extending the residence time and at the same time increasing the surface of the polycarbonate melt.

The guide elements may for example be in the form of perforated metal sheets, profiled metal sheets, wires, wire meshes, link chains, narrow metal strips of arbitrary cross-section, etc., and are preferably arranged substantially horizontally. Examples of such guide elements are described for example in DE-A 10 144 233 (=U.S. Pat. No. 6,761,797 incorporated herein by reference) or in EP-A 1 095 960 (=U.S. Pat. No. 6,265,526 incorporated herein by reference). Particularly preferably the guide elements are formed as wires, which are arranged substantially horizontally in the separating vessel. The degassing of the polycarbonate melt is thereby significantly improved, without a harmful backcleavage of the polycarbonate occurring.

The wires may be arranged in virtually any desired manner so long as the wires do not contact one another and are arranged substantially horizontally. Within the context of the present invention substantially horizontally means a maximum deviation from the horizontal of 20°. In particular, two or more wires should not contact one another, for example by crossing over. A plurality of wires may for example be provided in several levels, in which neither the wires of one level nor the wires of different levels contact one another. If a plurality of wires are provided in one level, then these may be arranged substantially parallel to one another. The wires of one level should in particular have an angle of at most 20°. If furthermore several levels of wires are provided, the wires of different levels may be arranged at any arbitrary angle to one another. Preferably the wires of different levels form an angle of at most 180°, particularly preferably 30° to 150° and most particularly preferably 70° to 110°. If the individual wires of a level are not spanned parallel, then the angle of rotation of the wires of different levels is determined according to the angle bisecting lines.

Preferred are wires with a diameter of 1 mm to 5 mm, particularly preferably 2 mm to 4 mm.

The advantage of substantially horizontally arranged wires, which are preferably clamped between opposite walls of the separating vessel, is that an effective surface regeneration and thus a good mass transfer between the gas space and polycarbonate melt may take place with a minimum contact area between the metal material of the wire and the polycarbonate melt. In the most unfavorable cases a large accumulation (hold-up) of highly viscous polycarbonate melt may form on vertically arranged wires, i.e. the polycarbonate melt forms blockages on the wires. This leads to unfavorable residence time distributions or to degradation of the polymer. Both may be deleterious as regards the quality of the product. Also, it has been found experimentally that a network, mesh, fabric or the like made of wires, as described for example in EP-A 1 095 960, tends to form a large hold-up of polycarbonate melt at the nodal points of the wires and leads to polymer degradation. Horizontally clamped wires produce in addition a good distribution of the foam strands and thus an effectively enlarged surface for mass transfer compared to metal sheets, etc.

A higher viscosity of the polycarbonate melt leads, with otherwise identical guide elements, to a larger hold-up, to greater layer thicknesses and to longer residence times.

The polycarbonate melt falls downwardly in the separating vessel into a sump and is removed therefrom by a suitable discharge device, for example a gear-type pump or a discharge extruder. The discharge is preferably effected with a gear-type pump. The bottom of the separating vessel is preferably designed conically with the tip pointing downwards. The angle of the cone with respect to the horizontal is preferably 20° to 60°, particularly preferably 30° to 45°. In the case of very large throughputs (for example more than 12 tons per hour) a design may be chosen in which the bottom of the separating vessel consists of several cones, each of which has a discharge device at its lowest point.

The volatile constituents separated in step (c) may be freed from the foaming agent that is possibly present and passed to a working-up stage. In this, the volatile constituents that are separated, which mainly contains solvents used in the process, may be recycled to the process for the production of the polycarbonate.

Advantageously the separated volatile components are not recycled to the process for the production of polycarbonate if only minor amounts of volatile components are separated from the polycarbonate melt in the process according to step (c), for example amounts of 0.1% to 0.5%. The effort and expenditure involved in recycling the volatile components must be weighed against the economic benefit of recycling. Also, the quality of the polycarbonate that is formed, for example as regards color, may be adversely affected if impurities are introduced into the process due to the recycling of solvents. A recycling of the monomers and oligomers separated in the process according to step (c) is not economical on account of their very small amount and may also affect the quality as regards color.

A recycling and working-up of the foaming agent is as a rule not economical on account of the small amounts that are employed.

The thermoplastic polycarbonates that are obtained by the process according to the invention are also covered by the present invention. These polycarbonates have a residual content of volatile substances (in particular monochlorobenzene) of at most 500 ppm, preferably at most 100 ppm and particularly preferably at most 25 ppm, referred to the polymer mass. The residual content of dichloromethane is at most 5 ppm, preferably at most 2 ppm and particularly preferably less than 0.5 ppm (free of dichloromethane).

For the process according to the invention, suitable diphenols for the production of polycarbonate are known and have been described in many publications.

Suitable diphenols are for example hydroquinone, resorcinol, dihydroxydiphenyl, bis-(hydroxyphenyl)-alkanes, bis-(hydroxyphenyl)-cycloalkanes, bis-(hydroxyphenyl) sulfides, bis-(hydroxyphenyl) ethers, bis-(hydroxyphenyl) ketones, bis-(hydroxyphenyl) sulfones, bis-(hydroxyphenyl) sulfoxides, $\alpha,\alpha'$-bis-(hydroxyphenyl)-diisopropylbenzenes, as well as their alkylated, nuclear-alkylated and nuclear-halogenated compounds.

Preferred diphenols are 4,4'-dihydroxydiphenyl, 2,2,-bis-(4-hydroxyphenyl)-1-phenylpropane, 1,1-bis-(4-hydroxyphenyl)-phenylethane, 2,2-bis-(4-hydroxyphenyl)-propane, 2,4-bis-(4-hydroxyphenyl)-2-methylbutane, 1,3-bis-[2-(4-hydroxyphenyl)-2-propyl]-benzene (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,3-bis-[2-(3,5-dimethyl-4-hydroxyphenyl)-2-propyl]-benzene and 1,1-bis-(4-hydroxyphenyl)-3,3,5-trimethylcyclohexane (bisphenol TMC).

Particularly preferred diphenols are 4,4'-dihydroxydiphenyl, 1,1-bis-(4-hydroxyphenyl)-phenylethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC).

In the case of homopolycarbonates only one diphenol is used, whereas in the case of copolycarbonates several diphenols are used, in which obviously the diphenols used, like also all the other chemicals and auxiliary substances employed in the synthesis, may be contaminated with impurities derived from their specific synthesis, handling and storage, although of course it is desirable to use raw materials that are as pure as possible.

The monofunctional chain terminators required to regulate the molecular weight, such as phenol or alkylphenols, in particular phenol, p-tert.-butylphenol, isooctylphenol, cumylphenol, their chlorocarbonic acid esters or acid chlorides of monocarboxylic acids or mixtures of these chain terminators, are either added together with the bisphenolate or the bisphenolates to the reaction, or alternatively are added at any suitable time to the synthesis so long as phosgene or chlorinated carbonic acid terminal groups are still present in the reaction mixture or, in the case of acid chlorides and chlorinated carbonic acid esters as chain terminators, so long as sufficient phenolic terminal groups of the polymer being formed are available. Preferably however the chain terminator or terminators is/are added after the phosgenation at a site or at a time at which phosgene is no longer present but the catalyst has not yet been metered in. Alternatively the chain terminators may also be metered in together or in parallel before the catalyst or with the catalyst.

In the same way optionally branching agents or mixtures of branching agents are added to the synthesis. Normally however branching agents are added before the chain terminators. As a rule trisphenols, quaternary phenols or acid chlorides of tricarboxylic acids or tetracarboxylic acids or mixtures of the polyphenols or acid chlorides are used. Some of the compounds suitable as branching agents and containing three or more than three phenolic hydroxyl groups are for example phloroglucinol, 4,6-dimethyl-2,4,6-tri-(4-hydroxyphenyl)-heptene-2,4,6-diemthyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Preferred branching agents are 3,3-bis-(3-methyl-4-hydroxyphenyl)-2-oxo-2,3-dihydroindole and 1,1,1-tri-(4-hydroxyphenyl)-ethane.

The catalysts used in the interfacial polymerization synthesis of polycarbonates include tertiary amines, in particular triethylamine, tributylamine, trioctylamine, N-ethylpiperidine, N-methylpiperidine, N-i/n-propylpiperidine, quaternary ammonium salts such as tetrabutylammonium, tributylbenzylammonium, tetraethylammonium hydroxide, chloride, bromide, hydrogen sulfate and tetrafluoroborate, as well as the phosphonium compounds corresponding to the ammonium compounds. These compounds are described in the literature as typical interfacial polymerization catalysts, are commercially obtainable, and are commonly known to the person skilled in the art. The catalysts may be added individually, as a mixture, or also side by side and in succession to the synthesis, optionally also before the phosgenation, but preferably metered in after the addition of phosgene, unless an onium compound or a mixture of onium compounds are used as catalysts. In this case an addition before phosgene is metered in is preferred. The metering in of the catalyst or catalysts may take place in bulk, in an inert solvent, preferably the solvent used for the polycarbonate synthesis, or also as aqueous solution, and in the case of tertiary amines then as their ammonium salts with acids, preferably mineral acids, in particular hydrochloric acid. When using several catalysts or when metering in partial amounts of the total catalyst amount, different metering procedures may of course also be employed at different sites or at different times. The total amount of the catalysts that are used is 0.001 to 10 mole % referred to moles of bisphenols used, preferably 0.01 to 8 mole %, particularly preferably 0.05 to 5 mole %.

The polycarbonate synthesis may be carried out continuously or batchwise. The reaction may therefore take place in stirred vessels, tubular reactors, circulating pump reactors or stirred vessel cascades or combinations thereof. In this connection it should be ensured by using the previously mentioned mixing devices that aqueous and organic phases as far as possible undergo demixing only when the synthesis mixture has fully reacted, i.e. when it no longer contains saponifiable chlorine from phosgene or chlorinated carbonic acid esters.

After addition of the phosgene it may be advantageous thoroughly to mix the organic phase and the aqueous phase for a certain time before optionally branching agent, insofar as this has not been metered in together with the bisphenolate, and chain terminator and catalyst are added. Such a post-reaction time may be advantageous after each metering step. These post-stirring times are from 10 seconds to 60 minutes, preferably 30 seconds to 40 minutes, particularly preferably 1 to 15 minutes.

The organic phase may contain a solvent or mixtures of several solvents. Suitable solvents are chlorinated hydrocarbons (aliphatic and/or aromatic), preferably dichloromethane, trichloroethylene, 1,1,1-trichloroethane, 1,1,2-trichloroethane and chlorobenzene, and their mixtures. There may however also be used aromatic hydrocarbons such as benzene, toluene, m/p/o-xylene or aromatic ethers such as anisole, alone or as a mixture with or in addition to chlorinated hydrocarbons. Another modification of the synthesis uses solvents that do not dissolve but only swell polycarbonate. Non-solvents for polycarbonate may therefore also be used in combination with solvents. In this connection solvents such as tetrahydrofuran, 1,3-/1,4-dioxane or 1,3-dioxolane that are also soluble in the aqueous phase may be used as solvent if the solvent partner forms the second organic phase.

The fully reacted, at least two-phase reaction mixture containing at most only traces (<2 ppm) of chlorinated carbonic acid esters is allowed to settle for the phase separation. The aqueous alkaline phase is recycled, possibly in whole or in part, as aqueous phase to the polycarbonate synthesis or alternatively is passed to the effluent working-up stage, where solvent and catalyst fractions are separated and recycled. In another variant of the working-up stage, after separating the organic impurities, in particular solvents and polymer residues, and optionally after the adjustment of a specific pH value, for example by adding sodium hydroxide, the salt is separated and may for example be passed to a chlorine-alkali electrolysis plant, while the aqueous phase is optionally recycled to the synthesis.

The organic phase containing the polycarbonate must now be purified to remove all contaminations of an alkaline, ionic or catalytic nature. The organic phase still also contains, after one or more settling procedures, fractions of the aqueous alkaline phase in the form of fine droplets as well as the catalyst, generally tertiary amine. The settling procedures may optionally be assisted by passing the organic phase through settling vessels, stirred vessels, coalescers or separators or combinations thereof, in which connection water may optionally be metered in in each or some of the separating steps, if necessary using active or passive mixing devices.

After this coarse separation of the alkaline, aqueous phase, the organic phase is washed once or several times with dilute acids, mineral acids, carboxylic acids, hydroxycarboxylic acids and/or sulfonic acids. Preferred are aqueous mineral acids, in particular hydrochloric acid, phosphorous acid and phosphoric acid or mixtures of these acids. The concentration of these acid is in the range 0.001 to 50 wt. %, preferably 0.01 to 5 wt. %.

In addition the organic phase is repeatedly washed with deionized or distilled water. The separation of the organic phase, possibly dispersed with some of the aqueous phase, after the individual wash stages is carried out by means of settling vessels, stirred vessels, coalescers or separators or combinations thereof, wherein the wash water may be metered in between the wash stages, optionally using active or passive mixing devices.

Acids, preferably dissolved in the solvent used to form the polymer solution, may optionally be added between these wash stages or also after the washing procedure. Hydrogen chloride gas and phosphoric acid or phosphorous acid are preferably used for this purpose, and may optionally also be used as mixtures.

Conventional additives (e.g. auxiliary substances and reinforcing agents) may be added to the polycarbonates obtained by the process according to the invention in order to alter the properties. The addition of additives serves to prolong the service life (e.g. hydrolysis stabilizers or decomposition stabilizers), to improve the color stability (e.g. thermal stabilizers and UV stabilizers), to simplify the processing (e.g. mould release agents, antiblocking agents), to improve the use properties (e.g. antistatics), to improve the flameproofing effect, to influence the optical impression (e.g. organic colorants, pigments), or to match the polymer properties to specific stresses (impact strength modifiers, finely comminuted minerals, fiberous substances, quartz flour, glass fibers and carbon fibers).

Figure 2:
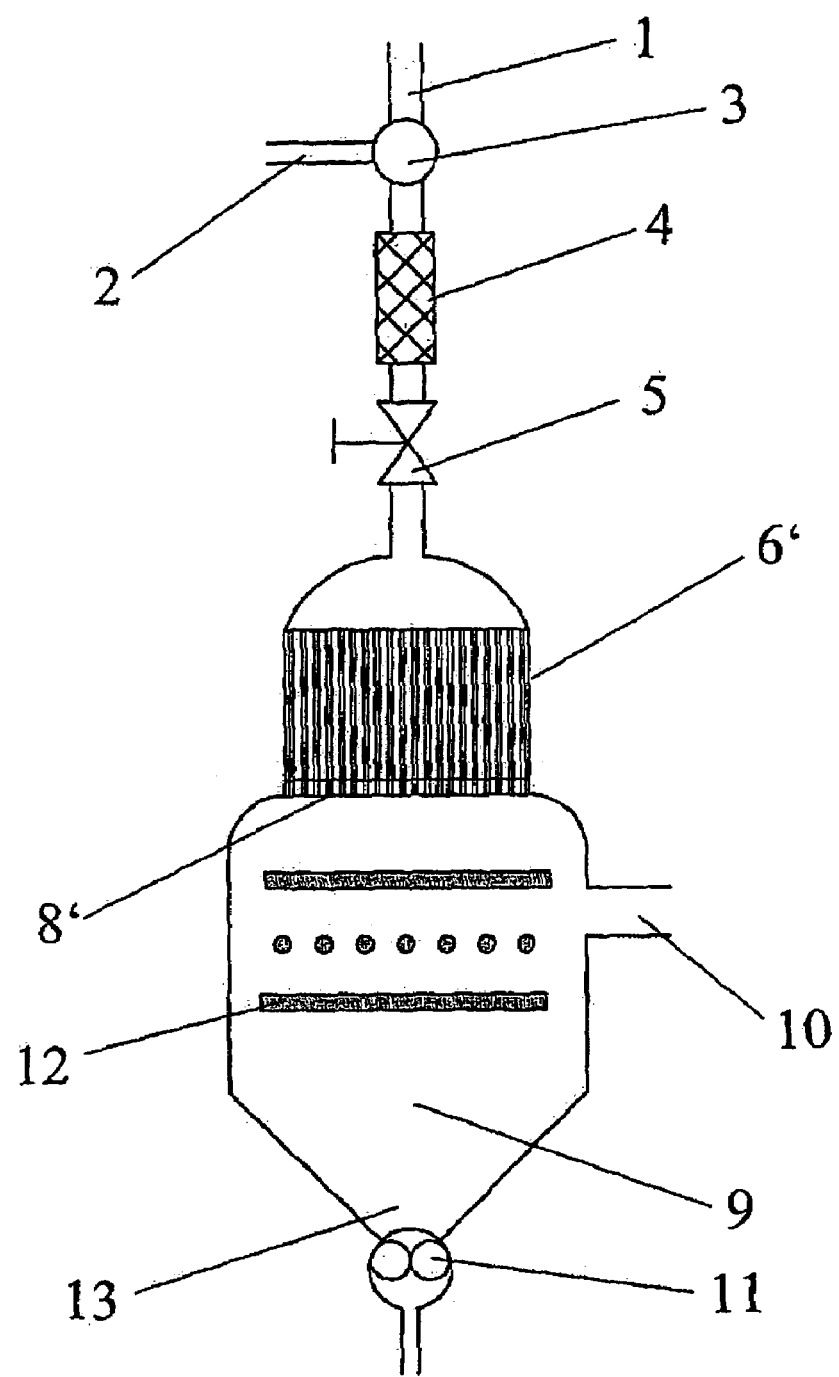
FIG. 2 shows diagrammatically a second embodiment of the separating vessel.

The invention is discussed in more detail hereinafter with the aid of the accompanying drawings, in which FIG. 1 shows diagrammatically a first embodiment of the separating vessel for carrying out the process according to the invention, FIG. 2 shows diagrammatically a second embodiment of the separating vessel.

In FIG. 1 a separating vessel 9 is shown that has in its upper region a horizontally arranged plate 7 with inlet openings 8. The separating vessel 9 has an outlet 10 for the volatile constituents as well as a downwardly directed conical outlet 13 in the lower region, which is provided with a discharge device 11. Guide elements in the form of wires 12 are provided in the interior of the separating vessel 9. The wires 12 are arranged substantially horizontally, wherein in each case several wires 12 form a level. The wires of a level are arranged substantially parallel to one another. Several levels of such parallel arranged wires 12 are provided (3 levels in FIG. 1), in which the wires of two superimposed levels are arranged at substantially right angles with respect to one another.

The polycarbonate melt is added through a feed line 1 to the separating vessel 9. With the aid of a feed line 2 foaming agent is mixed into the polycarbonate melt through a metering device 3. The polycarbonate/foaming agent mixture is first of all led through a static mixer 4 and then through a heat exchanger 6. The polycarbonate melt flows through a pressure retention valve 5 onto the plate 7 provided with the inlet openings 8. The melt is thereby divided into partial streams. The partial streams of the polycarbonate melt pass through the inlet openings 8 and enter the separating vessel 9. At the bottom of the conical outlet 13 of the separating vessel 9 the degassed polycarbonate melt is removed via the discharge device 11.

FIG. 2 shows, in contrast to the embodiment illustrated in FIG. 1, in the upper region of the separating vessel 9 a vertically arranged heat exchanger 6' in the form of a shell-and-tube heat exchanger. The downwardly directed tubes constitute the inlet openings 8'.

According to FIG. 2 the polycarbonate melt is fed through a feed line 1 to the separating vessel 9. With the aid of a feed line 2 foaming agent is mixed through a metering device 3 into the polycarbonate melt. The polycarbonate/foaming agent mixture is first of all passed through a static mixer 4. The polycarbonate melt then flows through a pressure retention valve 5 into the inlet openings 8' of a shell-and-tube heat exchanger 6', whereby the polycarbonate melt is subdivided into a plurality of partial streams. The inlet openings 8' terminate in the separating vessel 9. At the bottom of the conical outlet 13 of the separating vessel 9 the degassed polycarbonate melt is removed via the discharge device 11.

EXAMPLES

The experiments described hereinafter were carried out on polycarbonates that were produced based on bisphenol A in the interfacial polymerization process. The volatile component to be removed was in all experiments monochlorobenzene, and in one experiment was in addition dichloromethane. The results of the experiments are summarized in Table 1.

The entry concentrations of the solvents before the foam degassing step and optionally before the mixing in of a foaming agent are given in Table 1. Nitrogen was used as foaming agent in all experiments in which in general a foaming agent was employed. The dispersion of the foaming agent was carried out in a static mixer of the SMX type.

The state of the melt is likewise specified in the table: "one-phase" means that all volatile components, including foaming agent, were completely dissolved in the melt; "two-phase" means that, on entry into the inlet openings, a two-phase mixture existed and bubbles or droplets were already present in the melt. The pressure in the static mixer could be raised by means of a pressure retention valve.

The pressure before the inlet opening is specified, as is the estimated vapor pressure in the melt on entry into the inlet openings, the estimated value being obtained from the temperature and concentration of volatile constituents on entry into the inlet openings. From this the supersaturation may be calculated as the difference between the vapor pressure and pressure in the separator.

The relative viscosity is calculated from the ratio of the viscosity of a polymer solution to the viscosity of the pure solvent. The relative viscosity is generally determined at 25° C. in dichloromethane at a concentration of 5 g of polymer per 1 liter of solvent.

The temperature after the static mixer, i.e. after the mixing in of the foaming agent, before entry into the inlet openings and on entry into the separator are specified in each case. From this it may be determined whether any heating has occurred between the individual process steps.

The specified throughput refers to the throughput per inlet opening. The inlet openings are characterised by their diameter and length.

The internal fittings, or guide elements, consisted of horizontally arranged wires that were spanned underneath the inlet opening in the separator at a vertical distance of 10 cm between one another. The number in the table denotes the number of wires spanned horizontally under one another. In each case two wires arranged under one another were rotated with respect to one another by 90° in the horizontal plane. The diameter of the wires was 4 mm.

In the experiments 1–3, 5–13 and 16 heated tubes were used as inlet openings. In the examples the melt in these tubes was heated before the entry to the separator relative to the temperature at the entry to the inlet opening.

Experiment 4 was carried out with a nozzle at the end of a heated tube. The melt was in this case heated between the mixing in of the foaming agent and the inlet opening. In Example 4 the melt was no longer further heated in the inlet opening, i.e. in the nozzle itself.

Experiments 14 and 15 were also carried out with heated tubes as inlet openings, though in this case the diameters were significantly smaller (4 mm) in order to generate a higher pressure loss and thus maintain the melt as a one-phase melt before the inlet opening.

Experiments 17 and 18 were carried out with a nozzle plate, in which the melt was no longer heated after the mixing in of the foaming agent.

The supersaturation corresponds in all examples approximately to the pressure at the inlet opening, since the pressure in the separator is 1 mbar in all experiments.

The influence of the supersaturation on the degassing becomes clear on the basis of experiments 1 and 2. In experiment 1, on account of the MCB concentration of 1% the supersaturation of 0.8 bar is too low to produce an effective foam degassing. 5% MCB entry concentration as in experiment 2 is sufficient however to cause the melt to foam. The melt is in both cases still a single phase melt before the inlet opening. In experiment 3, in contrast to experiment 1 0.2% nitrogen is additionally added as foaming agent. The supersaturation consequently rises further, though the vapor pressure becomes so large that the melt is no longer present as a single phase. Compared to experiment 2 the degassing in experiment 3 is therefore less effective. In experiment 4 the pressure before the inlet opening was increased to such an extent by an altered geometry of the inlet opening that again a single phase flow is present before the inlet opening. The degassing is even better compared to experiment 3.

The experiments 5–7 were carried out with a very low MCB entry concentration of 0.1%. The supersaturation without foaming agent is only 0.1 bar. The supersaturation is increased only by the addition of foaming agent, whereupon the melt foams and the degassing proceeds down to a residual content of 17 ppm MCB. The degassing result is also slightly improved by internal fittings, as shown in experiment 7.

The experiments 8–10 illustrate the same effects as already discussed for experiments 5–6, though with an entry concentration of MCB of 0.5%. The foaming agent causes foaming and thus an effective degassing, while internal fittings improve the result slightly.

In the experiments 5–10 the flow at the entry to the degassing openings was a single phase flow, and the pressure loss in the inlet opening was also sufficiently large.

The experiments 11–13 illustrate the effect of the single phase on the degassing result. In experiment 12, 0.1% of foaming agent was added. The melt was still single phase before the inlet opening. In experiment 13 the amount of foaming agent was increased to 0.5%, whereby the vapor pressure rose to such an extent that the melt was two-phase before the inlet opening. The residual content is accordingly slightly increased in experiment 13 compared to experiment 12. However, the degassing with foaming agent in experiments 12 and 13 is also clearly more effective than without foaming agent under otherwise identical conditions, as demonstrated in experiment 11. The experiments 11–13 were carried out with four horizontal wires as internal fitting.

The experiments 14 and 15 were carried out with a heated tube of 4 mm diameter. As shown in the table, the pressure before the inlet opening, i.e. in front of the tube, is accordingly significantly higher than in the case of the 10 mm diameter tubes, despite the relatively high temperature and smaller throughput of only 2 kg/hr. The degassing with foaming agents is very effective in experiment 15, and on account of the high pressure before the inlet opening the melt is in each case single phase.

Experiment 16 is an example showing that also dichloromethane (DCM) may be removed to extremely low residual contents by means of foam degassing. The DCM residual content is less than 2 ppm.

The experiments 17 and 18 were carried out with a nozzle plate without intermediate heating of the melt. The throughput per bore was 0.15 kg/hr. Due to the use of foaming agents an effective removal of volatile constituents may be achieved also by using a nozzle plate.

The experiments show that a removal of volatile constituents from a polycarbonate melt down to very low residual contents is possible by foam degassing. By a suitable choice of the process parameters an optimal adjustment as regards temperature, amounts of foaming agent and solvent, and pressure loss may be found for different apparatus configurations.

TABLE 1

| | Entry Solvent | | Entrainment Agent | | | Through-put | | Inlet Opening | | Temperatures | | |
|---|---|---|---|---|---|---|---|---|---|---|---|---|
| Expm. | MCB* [wt. %] | DCM** [wt. %] | Type | Amount [wt. %] | State of Melt | PC*** [kg/hr] | Relative Viscosity | Diam. [mm] | Length [mm] | After mixer [° C.] | Inlet opening [° C.] | Separator [° C.] |
| 1 | 1.0 | — | — | — | sngl-phs | 3 | 1.288 | 10 | 1150 | 280 | 280 | 300 |
| 2 | 5.0 | — | — | — | sngl-phs | 3 | 1.288 | 10 | 1150 | 280 | 280 | 300 |
| 3 | 1.0 | — | N2 | 0.2 | two-phs | 3 | 1.288 | 10 | 1150 | 280 | 280 | 300 |
| 4 | 1.0 | — | N2 | 0.2 | sngl-phs | 3 | 1.31 | 3.5 | 50 | 280 | 300 | 300 |
| 5 | 0.1 | — | — | — | sngl-phs | 5 | 1.288 | 10 | 1150 | 295 | 295 | 315 |
| 6 | 0.1 | — | N2 | 0.3 | sngl-phs | 5 | 1.288 | 10 | 1150 | 295 | 295 | 315 |
| 7 | 0.1 | — | N2 | 0.3 | sngl-phs | 5 | 1.288 | 10 | 1150 | 295 | 295 | 315 |
| 8 | 0.5 | — | — | — | sngl-phs | 5 | 1.288 | 10 | 1150 | 295 | 295 | 315 |
| 9 | 0.5 | — | N2 | 0.3 | sngl-phs | 5 | 1.288 | 10 | 1150 | 295 | 295 | 315 |
| 10 | 0.5 | — | N2 | 0.3 | sngl-phs | 5 | 1.288 | 10 | 1150 | 295 | 295 | 315 |
| 11 | 0.5 | — | — | — | sngl-phs | 3 | 1.288 | 10 | 1150 | 280 | 28000 | 330 |
| 12 | 0.5 | — | N2 | 0.1 | sngl-phs | 3 | 1.288 | 10 | 1150 | 280 | 280 | 330 |
| 13 | 0.5 | — | N2 | 0.5 | two-phs | 3 | 1.288 | 10 | 1150 | 280 | 280 | 330 |
| 14 | 0.5 | — | — | — | sngl-phs | 2 | 1.288 | 4 | 300 | 310 | 310 | 315 |
| 15 | 0.5 | — | N2 | 0.2 | sngl-phs | 2 | 1.288 | 4 | 300 | 310 | 310 | 315 |
| 16 | 9.6 | 0.4 | — | — | sngl-phs | 5 | 1.288 | 10 | 1150 | 280 | 280 | 295 |
| 17 | 0.5 | — | — | — | sngl-phs | 0.15 | 1.288 | 1 | 10 | 315 | 315 | 315 |
| 18 | 0.5 | — | N2 | 0.2 | sngl-phs | 0.15 | 1.288 | 1 | 10 | 315 | 315 | 315 |

TABLE 1-continued

| Expm. | Vapor press. at entry to sepr. [bar] | Press. at inlet opening [bar] | Press. of separator [mbar] | Intnl. fitting horiz. wires | Residual Content | |
|---|---|---|---|---|---|---|
| | | | | | MCB* [ppm] | DCM** [ppm] |
| 1 | 0.8 | 10.4 | 1 | — | 126 | **** |
| 2 | 3.7 | 4.9 | 1 | — | 10 | **** |
| 3 | >10 | 2.6 | 1 | — | 45 | **** |
| 4 | >10 | 20.6 | 1 | — | <20 | **** |
| 5 | 0.1 | 23.5 | 1 | — | 934 | **** |
| 6 | >15 | 23 | 1 | — | 17 | **** |
| 7 | >15 | 22 | 1 | 10 | 7 | **** |
| 8 | 0.4 | 20.6 | 1 | — | 1600 | **** |
| 9 | >15 | 21.8 | 1 | — | 20 | *** |
| 10 | >15 | 19.3 | 1 | 10 | 13 | **** |
| 11 | 0.6 | 94 | 1 | 4 | 340 | **** |
| 12 | >10 | 10.1 | 1 | 4 | 11 | **** |
| 13 | >20 | 11.2 | 1 | 4 | 18 | **** |
| 14 | 0.5 | 42.9 | 1 | — | 955 | **** |
| 15 | >15 | 40 | 1 | — | 10 | **** |
| 16 | 6.1 | 6.5 | 1 | — | 60 | <2 |
| 17 | 0.5 | 63 | 1 | — | 235 | **** |
| 18 | >15 | 51 | 1 | — | 30 | **** |

*Monochlorobenzene
**Dichloromethane
***Polycarbonate per partial stream in a pressure release device
****not measured Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. In the process for producing polycarbonate by interfacial polymerization the improvement comprising
    (a) evaporating the organic solvent from the solution that comprises solvent and polycarbonate to obtain a melt that contains 90 to 99.95% polycarbonate, the percent being relative to the weight of the melt, and
    (b) passing the melt through inlet openings of a separating vessel to obtain a plurality of streams of polycarbonate, on entry into the inlet openings said melt being supersaturated with volatile constituents to an extent of at least 1 bar and having a temperature of 250° to 340° C. and a flow rate of 0.1 to 20 kg/hour, and
    (c) degassing the streams in the separating vessel wherein the pressure is 0.1 to 20 mbar to effect degassing of the polycarbonate and
    (d) obtaining polycarbonate containing less than 250 ppm of volatile constituents.

2. The process of claim 1 wherein a foaming agent is mixed into the melt before passing the melt through the inlet openings of the separating vessel according to step (b).

3. The process of claim 2 wherein the foaming agent is completely dissolved in the system before (b).

4. The process of claim 1 wherein the residence time of the streams in the separating vessel is at most 10 minutes.

5. The process of claim 1 wherein the separating vessel includes at least one substantially horizontally arranged guide element.

6. The process of claim 1 wherein the melt is heated or cooled between steps (a) and (b) and/or (b) and (c).

7. The process of claim 1 wherein the melt is heated after passing through the inlet openings.

* * * * *